_Patented Sept. 13, 1949_

2,481,811

UNITED STATES PATENT OFFICE 2,481,811

IMPROVING CUT GROWTH RESISTANCE OF BUTADIENE-VINYL PYRIDINE RUBBERY COPOLYMERS

Bernard C. Barton, Clifton, N. J., assignor to United States Rubber Company, New York, N. Y., a corporation of New Jersey No Drawing. Application April 1, 1948, Serial No. 18,499

9 Claims. (Cl. 260—79.5)

This invention relates to butadiene-vinyl pyridine rubbery copolymers and specifically to improving the cut growth resistance of such rubbery copolymers.

Rubbery copolymers of butadiene-1,3 and vinyl pyridine are well known materials, having been described in German Patent No. 695,098 and in U. S. Patent No. 2,402,020. However, vulcanized butadiene-vinyl pyridine copolymers have not exhibited satisfactory cut growth resistance with the result that their suitability for many purposes was greatly impaired.

I have now found that the cut growth resistance of butadiene-vinyl pyridine rubbery copolymers can be greatly enhanced by adding thereto, prior to curing, a small amount of a halogenated lower aliphatic saturated monocarboxylic acid. In some cases as little as 0.1 part by weight of the halogenated lower fatty acid per 100 parts by weight of butadiene-vinyl pyridine copolymer is sufficient to show improvement. However, I prefer to employ from 1 to 6 parts by weight of the halogenated lower fatty acid per 100 parts by weight of the butadiene-vinyl pyridine rubbery copolymer because maximum improvement in cut growth resistance is found within this range. Larger amounts than 6% may be used but are generally unnecessary.

In a typical method of practicing my invention, a vulcanizable mix is prepared containing the butadiene-vinyl pyridine rubbery copolymer and the usual rubber compounding components such as carbon black, zinc oxide, softeners such as pine tar or asphalt or the like, stearic acid, the customary vulcanizing agent, generally sulfur, and vulcanization accelerators. In the formulation of the compound, in accordance with my invention there is incorporated a small amount of the halogenated lower fatty acid. The compounding is usually effected on the regular rubber mill in the usual manner. The resulting compound is then shaped in the usual way and vulcanized in accordance with conventional practice. The resulting vulcanizate exhibits greatly increased cut growth resistance over the same material made without the halogenated lower fatty acid, and none of its other physical properties are impaired. The practice of my invention does not interfere in any respect with the conventional compounding and vulcanizing techniques.

Any halogenated lower (at least two but not over six carbon atoms per molecule) aliphatic saturated monocarboxylic acid may be employed in the practice of my invention. I prefer to use those wherein the halogen is chlorine or bromine. The halogen may be substituted on any carbon atom in the alkyl chain connected to the carboxylic acid group. Any number of halogen groups may be substituted on the alkyl chain. Examples of halogenated lower fatty acids which may be used are: chloroacetic acid, bromoacetic acid, dichloroacetic acid, trichloroacetic acid, alpha-chloropropionic acid, beta-chloropropionic acid, alpha-alpha-dichloropropionic acid, alpha-chloro-n-butyric acid, alpha-chloroisobutyric acid, gamma-chloro-n-butyric acid, chlorovaleric acid, chlorocaproic acid, etc. The halogenated lower fatty acids used in my invention are preferably free from substitution with groups other than halogen. I generally use those acids wherein the halogen is substituted on the alpha carbon atom.

From the standpoint of cost and availability, and of high effectiveness in increasing cut growth resistance chloroacetic acid is by far the preferred material for use in my invention.

I have found that unhalogenated lower aliphatic saturated monocarboxylic acids are not capable of producing the marked increase in cut growth resistance of butadiene-vinyl pyridine rubber that is produced by the halogenated acids of my invention. This is illustrated by the examples below.

Any butadiene-vinyl pyridine rubbery copolymer may be used in the practice of the present invention. I usually employ a rubbery copolymer of butadiene and 2-vinyl pyridine but the vinyl group may be in any other position on the pyridine, as exemplified by 4-vinyl pyridine. The vinyl pyridine may also be substituted on the pyridine with an alkyl group, as typified by 2-methyl-6-vinyl pyridine. The proportions of butadiene-1,3 and the vinyl pyridine used in making the rubbery copolymer may vary widely as is well known in the art. Usually from 25 to 75% of butadiene and correspondingly from 75 to 25% of the vinyl pyridine are employed. The polymerization of these two monomers is conducted in any manner known to the art, aqueous emulsion polymerization generally being used. The method of making the butadiene-vinyl pyridine rubbery copolymer does not constitute per se any part of the present invention.

The following experiments show the effectiveness of halogenated lower fatty acids in improving cut growth resistance of rubbery butadiene-vinyl pyridine copolymers. Contrary to the well known retarding effect which acids exert on the curing of natural rubber and GR-S (butadienestyrene rubbery copolymer), the effect which the halogenated lower fatty acids employed in accordance with the present invention exerts upon the curing of the vinyl pyridine rubber is either nil or is a promoting effect, as judged by the modulus of the vulcanizate.

The copolymer used in all of the experiments described hereinafter was made from monomers consisting of butadiene-1,3 and 2-vinyl pyridine in a ratio of 75 parts butadiene to 25 parts 2-vinyl pyridine. All parts herein are by weight.

Examples 1 to 5

There was first prepared a master batch having the following composition:

| | Parts by weight |
|---|---|
| Butadiene-vinyl pyridine copolymer | 100 |
| Carbon black | 50 |
| Pine tar | 2 |
| Zinc oxide | 5 |
| Sulfur | 2 |
| Benzylidene bis-dimethyldithiocarbamate | 0.5 |

The acids indicated in the following table were incorporated with portions of the master batch in the proportions indicated in the table and the resulting stocks were cured for 30 minutes and 60 minutes at 45 p. s. i. steam pressure as indicated. As a control (Example 1) the same tests were made on a portion of the cured master batch containing no added acid. Chloroacetic acid was used in Example 2. Examples 3, 4 and 5 compare the effect of acetic acid, oxalic acid and stearic acid, respectively. The results were as indicated in the table.

| Example | Acid Added | Parts by weight of acid (per 159.5 parts of master batch) | Cure (Minutes, 45# Steam) | Modulus-stress at 300% Elongation (p. s. i.) | Cut Growth Resistance (Kilocycles per inch of growth) |
|---|---|---|---|---|---|
| 1a | None | | 30 | 1725 | 115 |
| 1b | do | | 60 | 1730 | 60 |
| 2a | Chloroacetic Acid | 2.0 | 30 | 1675 | 585 |
| 2b | do | 2.0 | 60 | 1950 | 515 |
| 3a | Acetic Acid | 1.3 | 30 | 1950 | 60 |
| 3b | do | 1.3 | 60 | 2150 | 70 |
| 4a | Oxalic Acid | 2.8 | 30 | 1875 | 135 |
| 4b | do | 2.8 | 60 | 2100 | 80 |
| 5a | Stearic Acid | 6.4 | 30 | 1450 | 125 |
| 5b | do | 6.4 | 60 | 1600 | 130 |

Examples 6 to 9

In Examples 6 to 9 the same master batch as was used in Examples 1 to 5 was employed. With 159.5 parts of this master batch there were incorporated 3 parts of each of alpha-chloropropionic acid, bromoacetic acid, and dichloroacetic acid. A comparative run (Example 6) contained no acid. All of the stocks were vulcanized under the same conditions, namely, for 60 minutes at 45 pounds of steam pressure. The results were as follows:

| Example Number | 6 | 7 | 8 | 9 |
|---|---|---|---|---|
| | Control | Halogenated Lower Fatty Acids | | |
| Master Batch (parts) | 159.5 | 159.5 | 159.5 | 159.5 |
| Alpha-chloropropionic Acid | | 3.0 | | |
| Bromoacetic Acid | | | 3.0 | |
| Dichloroacetic Acid | | | | 3.0 |
| Stress at 300% Elongation (p. s. i.) | 1,800 | 2,175 | 2,085 | 2,170 |
| Cut Growth Resistance (Kilocycles per inch of growth) | 40 | 380 | 140 | 210 |

The variations in stress of the various materials made as described in the foregoing examples are without any substantial significance. All of the stocks tested were good stocks.

From the foregoing it will be apparent that the present invention provides a simple and economical method of overcoming the serious disadvantage of vulcanizates made from rubbery butadiene-vinyl pyridine copolymers, namely, their low resistance to cut growth. Incorporation of the halogenated lower fatty acids of the present invention into the mix is carried out readily by standard technique and standard compounding and vulcanizing equipment are employed. The halogenated lower fatty acids do not have any adverse or deleterious effect during compounding and vulcanizing or upon the vulcanized product. The preferred material, namely, chloroacetic acid, is comparatively cheap and is readily available and therefore does not present any problem of unduly increasing the cost of manufacture of cured butadiene-vinyl pyridine copolymer rubber products.

Having thus described my invention, what I claim and desire to protect by Letters Patent is:

1. As a new composition of matter, cured butadiene-vinyl pyridine rubbery copolymer the cut growth resistance of which is substantially enhanced by curing in the presence of from 1 to 6% by weight based on the weight of said copolymer of a halogenated lower fatty acid in admixture therewith.

2. As a new composition of matter, cured butadiene-vinyl pyridine rubbery copolymer the cut growth of which is substantially enhanced by curing in the presence of from 1 to 6% by weight based on the weight of said copolymer of chloroacetic acid in admixture therewith.

3. As a new composition of matter, cured butadiene-vinyl pyridine rubbery copolymer the cut growth of which is substantially enhanced by curing in the presence of from 1 to 6% by weight based on the weight of said copolymer of alpha-chloropropionic acid in admixture therewith.

4. As a new composition of matter, cured butadiene-vinyl pyridine rubbery copolymer the cut growth of which is substantially enhanced by curing in the presence of from 1 to 6% by weight based on the weight of said copolymer of dichloroacetic acid in admixture therewith.

5. As a new composition of matter, a vulcanizable mixture containing a butadiene-vinyl pyridine rubbery copolymer and from 1 to 6% by weight based on the weight of said copolymer of a halogenated lower fatty acid, said mixture upon vulcanization yielding a vulcanized rubber having a cut growth resistance which is substantially greater than an identical rubber which does not contain said halogenated lower fatty acid.

6. The process of making vulcanized butadiene-vinyl pyridine copolymer rubber of substantially increased cut growth resistance which comprises forming a vulcanizable mixture containing butadiene-vinyl pyridine rubbery copolymer and from 1 to 6% by weight based on the weight of said copolymer of a halogenated lower fatty acid, and vulcanizing said mixture.

7. The process of claim 6 wherein said acid is chloroacetic acid.

8. The process of claim 6 wherein said acid is alpha-chloropropionic.

9. The process of claim 6 wherein said acid is dichloroacetic acid.

BERNARD C. BARTON.

No references cited.